United States Patent [19]
Alcock et al.

[11] 3,800,645
[45] Apr. 2, 1974

[54] HYDRAULICALLY OPERATED CROPPING APPARATUS

[75] Inventors: Richard A. Alcock, Rockford; Wayne A. Shosie, Loves Park, both of Ill.

[73] Assignee: Fasteners Engineers, Inc., Rockford, Ill.

[22] Filed: Sept. 21, 1972

[21] Appl. No.: 290,892

[52] U.S. Cl............................. 83/198, 83/82, 83/293, 83/308, 83/320, 83/287
[51] Int. Cl............................................... B26d 1/04
[58] Field of Search............... 83/26, 46, 82, 37, 81, 83/142, 291, 292, 300, 319, 196, 320, 156, 158, 293, 310, 586, 639, 287, 198

[56] References Cited
UNITED STATES PATENTS

| | | | |
|---|---|---|---|
| 3,566,728 | 3/1971 | Ohmasu | 83/292 X |
| 3,496,813 | 2/1970 | Valente | 83/26 |
| 3,309,952 | 3/1967 | Walsh | 83/54 X |
| 3,293,968 | 12/1966 | Reilly | 83/320 X |
| 3,224,310 | 12/1965 | Bieri | 83/308 X |
| 2,341,870 | 2/1944 | Johnston | 83/308 X |
| 3,522,750 | 8/1970 | Shallenberg | 83/82 |

Primary Examiner—Andrew R. Juhasz
Assistant Examiner—W. D. Bray
Attorney, Agent, or Firm—Morsbach, Pillote & Muir

[57] ABSTRACT

An apparatus for shearing end sections from elongated metal stock in which the shear members are moved crosswise of the stock in a shear stroke and returned by an hydraulic operator. Fluid under pressure is reversibly supplied to the hydraulic operator under the control of a flow reversing valve having an electro-responsive actuator, and the distance through which the hydraulic operator moves the shear members is controlled by an interval timer which applies an electrical pulse to the electro-responsive valve operator of a duration sufficient to cause the hydraulic operator to move the shear members in their shear stroke. The interval timer is actuated by a stock gauge after a predetermined length of stock has advanced past the shear members. The shear members are advantageously mounted on a movable carriage for movement with the stock.

13 Claims, 9 Drawing Figures

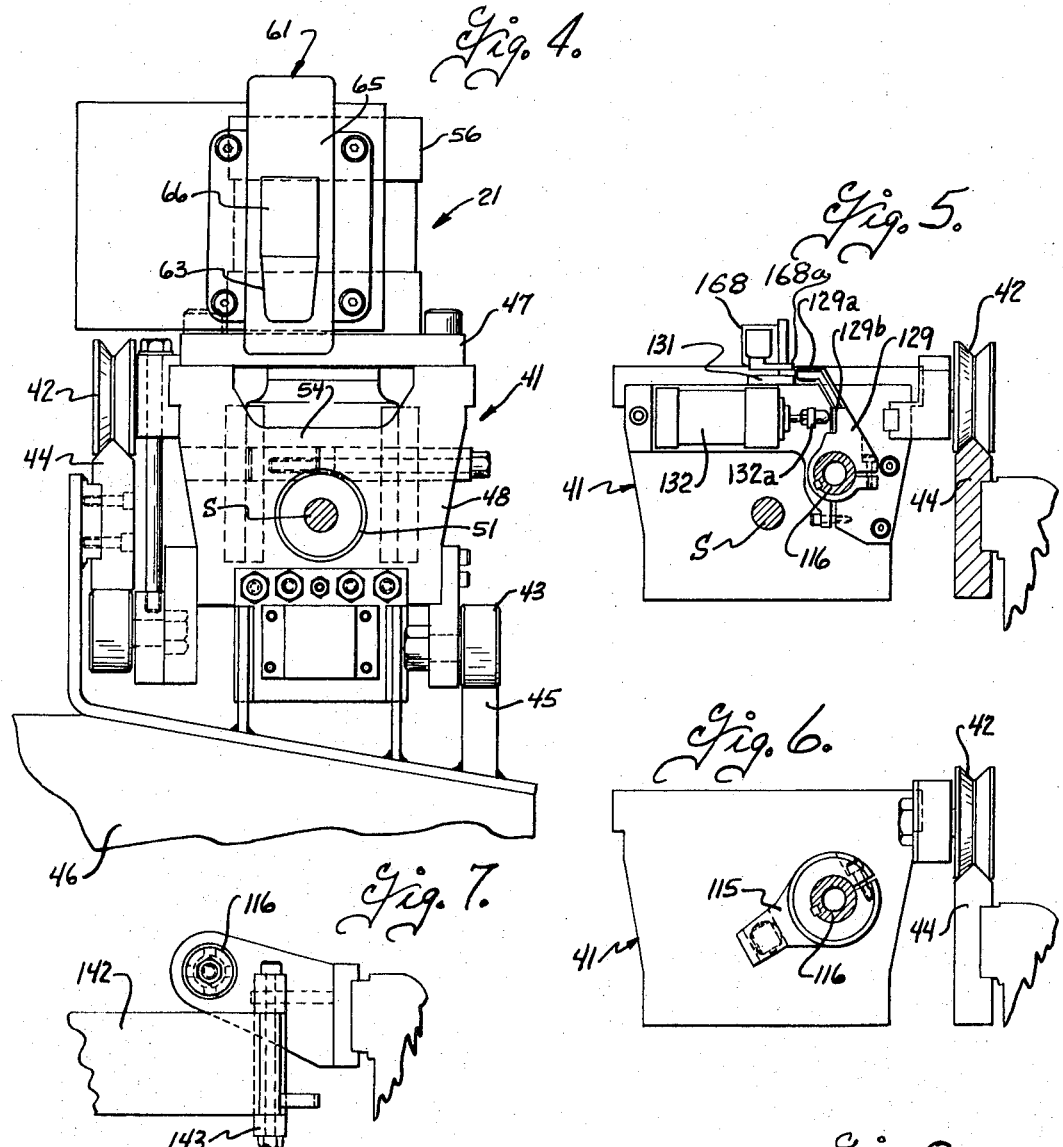
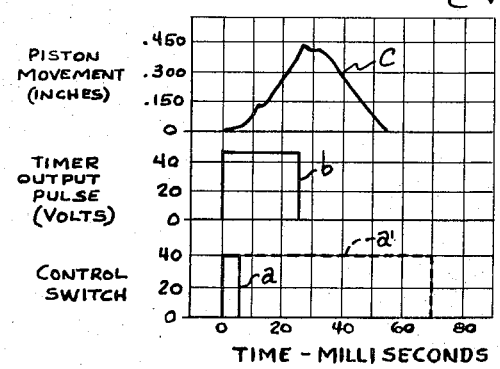

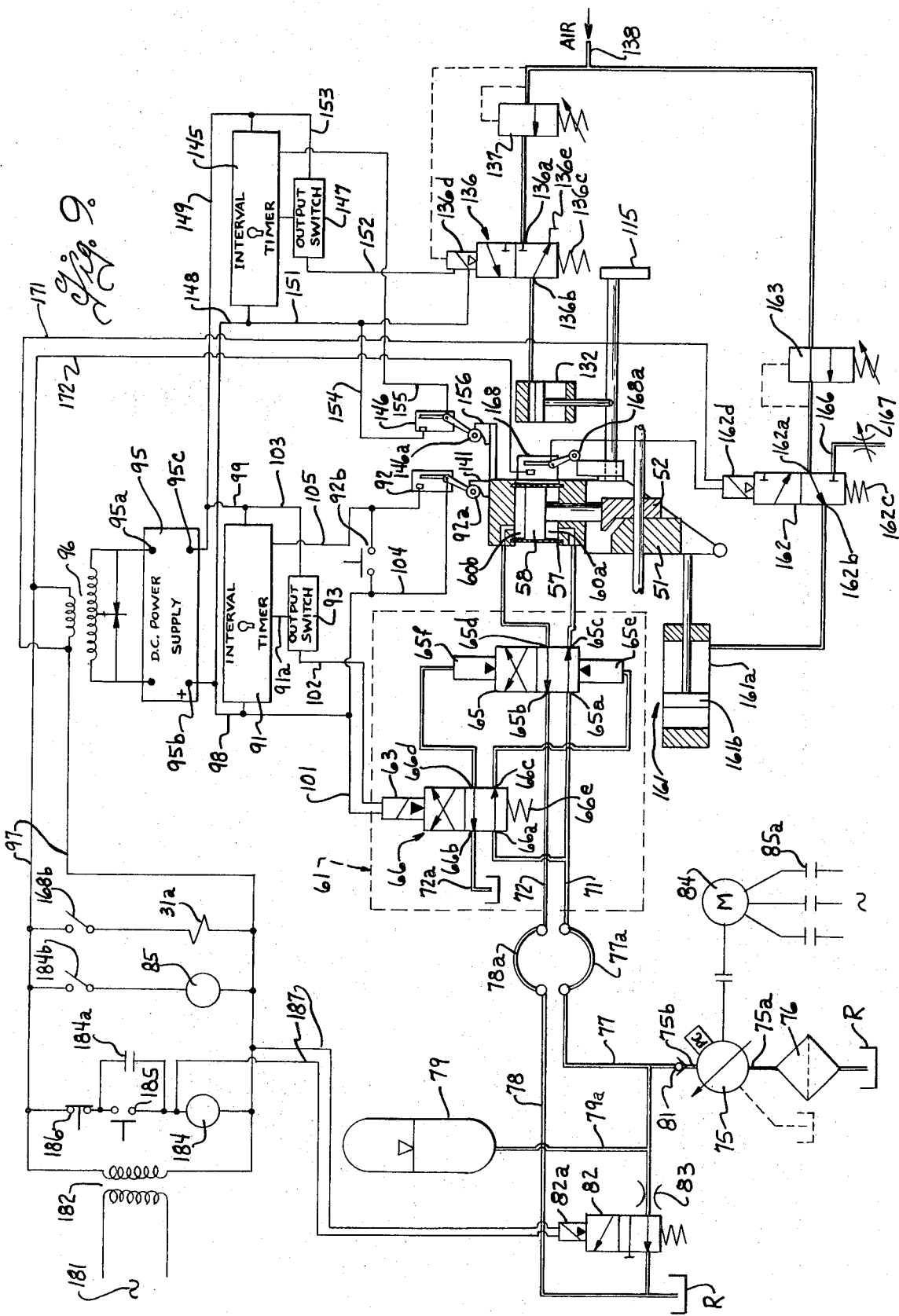

HYDRAULICALLY OPERATED CROPPING APPARATUS

BACKGROUND OF THE INVENTION

Shear apparatus have heretofore been made which utilize an hydraulic operator for moving the shear members crosswise of the stock in a shear stroke and valves for reversibly supplying fluid pressure to the hydraulic operator. In general, the prior hydraulically operated shear apparatus utilized a crop initiating switch mechanism for actuating the valves to move the shear members in a shear stroke and a separate limit switch mechanism operated by the shear members after they had moved a preselected distance to shift the valves and effect return movement of the shear members. Problems were encountered when attempting to utilize this arrangement for high speed shearing operations, for example when the shear cycle including the shear stroke and return is effected in an overall cycle time of the order of 40 to 100 milli-seconds. In such high speed shearing, problems of double and even multiple cycling of the shear apparatus were encountered since the shear members would move through a shear stroke and then return before the cycle initiating switch was opened. Moreover, at such high cropping speeds, difficulties were encountered due to bounce, and hence multiple actuation, of the shear member operated limit switches, which bounce would itself cause multiple or erratic shear operation under some conditions.

SUMMARY OF THE INVENTION

It has been found that high quality crop cuts can be achieved by rapidly moving the shear members through a shear stroke which is small as compared to the diameter of the stock being cut and preferably of the order of less than one-half the stock diameter. For example, a shear stroke of the order of ¼ inch to ⅜ inch has been found suitable for stock from between ⅝ to 1½ inches in diameter, with the shorter strokes being preferred for the smaller diameter stocks. Moreover, in order to reduce tearing and to minimize wiping of the advancing stock against the sheared end, it is important to effect rapid movement of the shear members in their shear stroke and then return the same to their normally opened position so as to avoid interference with the advancing stock.

The present invention relates to a hydraulically operated cropping apparatus having an hydraulic operator for moving the shear members in a shear stroke and return. The flow of fluid to the hydraulic operator is controlled by a flow reversing valve which is normally biased to a position to retract the hydraulic operator and return the shear members to their open positions, and the valve has an electro-responsive actuator which is operative, when energized, to shift the valve to a position applying fluid to the hydraulic operator to move the shear members in a shear stroke. In accordance with the present invention, the stroke of the shear members is controlled by a one-shot interval timer. The interval timer is connected to the electro-responsive valve actuator to apply a short duration electrical pulse to the valve actuator in response to operation of a timer control switch. The duration of the electrical pulse applied by the timer to the valve actuator is settable to a time interval sufficient to cause the hydraulic operator to move the shear members in a relatively short shear stroke and, at the end of the timed electrical pulse, the valve biasing means moves the valve back to a position returning the hydraulic operator and shear members to their normal open position.

The interval timer controlled hydraulic cropping apparatus allows high speed operation of the hydraulic shear without encountering double or multiple cycling of the shear apparatus at high speeds. The one-shot interval timer contributes to reducing the overall shear cycle time by energizing the valve actuator for only a short time interval sufficient to move the shear members in a short shear stroke, followed by automatic return of the shear members to the normally open position. In order to assure rapid movement of the shear members in the shear stroke and return, the flow reversing valve is selected of a size capable of passing without excessive pressure loss the requisite flows of hydraulic fluid to and from the hydraulic operator in the short time interval involved and, in order to assure adequate supply of hydraulic fluid, an hydraulic accumulator is utilized in the supply line. The hydraulic supply advantageously includes a pressure compensated pump which will maintain a preset output pressure and the pressure compensated pump is advantageously of the adjustable type to adjust the output pressure in accordance with the size of the stock being cut, to assure adequate shearing force. The shear members and hydraulic operator are advantageously mounted on a carriage for movement with the stock to facilitate accurate gauging of the length of parts and to simplify ejection of the part after it is cropped.

These, together with other features and advantages of this invention will be more readily understood by reference to the following detailed description when taken in connection with the accompanying drawings wherein:

FIG. 4 is an end elevational view of the hydraulically operated cropping apparatus taken on the plane 4—4 of FIG. 3;

FIG. 5 is a fragmentary sectional view taken on the plane 5—5 of FIG. 3;

FIG. 6 is a fragmentary sectional view taken on the plane 6—6 of FIG. 3;

FIG. 7 is a fragmentary sectional view taken on the plane 7—7 of FIG. 3;

FIG. 8 is a graph containing a set of curves diagrammatically illustrating the time rate of change of the control switch signal; the interval timer output voltage and the hydraulic actuator movement; and FIG. 9 is a schematic diagram illustrating the hydraulic, pneumatic and electrical controls for the hydraulically operated cropping apparatus.

Figure 1:
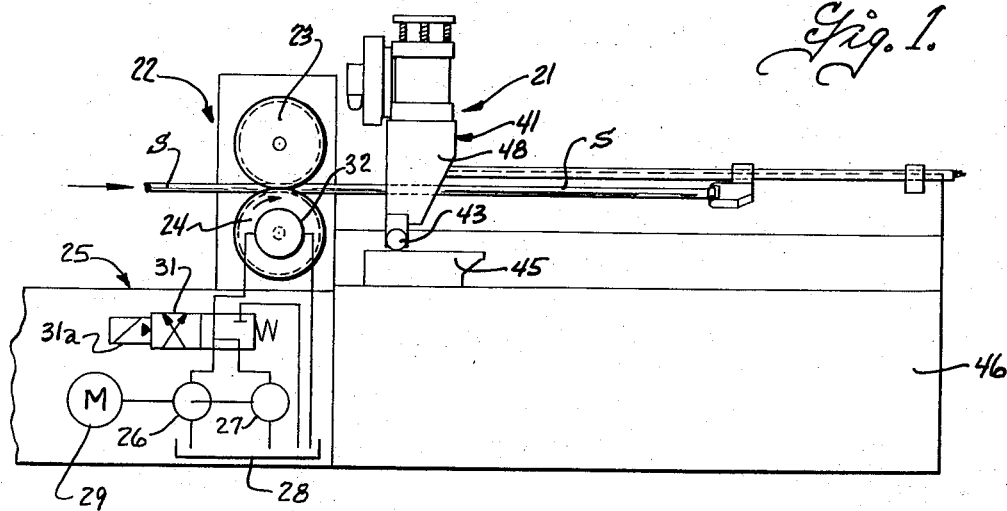
FIG. 1 is a side elevational view of the hydraulically operated cropping apparatus of the present invention shown applied to a stock feed mechanism.

The hydraulically operated cropping apparatus designated generally by the numeral 21 is adapted to sever end sections of an elongated stock S such as wire rod or the like which is fed thereto by a stock feed mechanism 22. The stock feed mechanism 22 can be of various different types and, in the embodiment illustrated in FIG. 1, comprises a pair of stock feed rolls 23, 24 which grip the stock therebetween and which are driven by a feed roll drive mechanism 25 to advance the stock into engagement with a stock gauge. For reasons pointed out hereinafter, a two speed drive mechanism is preferably used to drive the feed rolls and hence the stock at a relatively high speed until the stock engages the stock gauge and to thereafter drive the feed rolls at a slower speed during operation of the cropping apparatus. As schematically shown in FIG. 1, the drive mechanism is of the hydraulic type including a high volume pump 26 and a low volume pump 27 driven by an electric motor 29. The high and low volume pumps withdraw hydraulic fluid from a reservoir 28 and both pumps return the fluid through a valve 31 to an hydraulic drive motor 32 drivingly connected to at least one of the feed rolls 24. The valve 31 is operative in the position shown in FIG. 1 to pass fluid from both pumps 26 and 27 to the motor 32 to drive the feed rolls at a high speed and the valve 31 is shifted when the electroresponsive valve actuator 31a is energized, to a second position passing fluid from only the low volume pump 27 to the motor 32 while by-passing fluid from the high volume pump 26, back to the reservoir 28, for low speed operation of the feed rolls. While a specific stock feed mechanism has been diagrammatically illustrated in FIG. 1, it is to be understood that other stock feed mechanisms can be utilized to advance a selected length of wire past the cropping apparatus 21.

Referring now more specifically to FIGS. 2–6, the hydraulically operated cropping apparatus 21 includes a carriage 41 which is mounted as by rollers 42 and 43 on rails 44, 45 for limited movement relative to a base 46, in a direction paralleling the path of advance of the stock S. The carriage 41 comprises a generally rigid body having a generally horizontal plate 47 and spaced legs 48. The cropping apparatus includes first and second shear members 51 and 52 which are supported for relative shearing movement in a direction crosswise of the stock. One of the shear members 51 is fixedly mounted in an apertured boss 54 that extends between the legs 48 of the carriage 41. The other shear member 52 is secured to a movable shear head 55 which is supported for movement crosswise of the stock by an hydraulic operator 56. The shear members 51 and 52 are preferably of the apertured die type having apertures 51a and 52a respectively which are aligned when the die members are in their open position to allow passage of the stock therethrough. While the apertured die type shear members are preferred for high quality cuts, it is to be understood that the movable shear member can be of the semi-open type, in which the shear member engages only one-half of the circumference of the stock. The shear members 51, 52 are removably mounted on the boss 51 and head 55 respectively, to enable replacement when worn or with different size die members for shearing different size stock.

Figure 2:
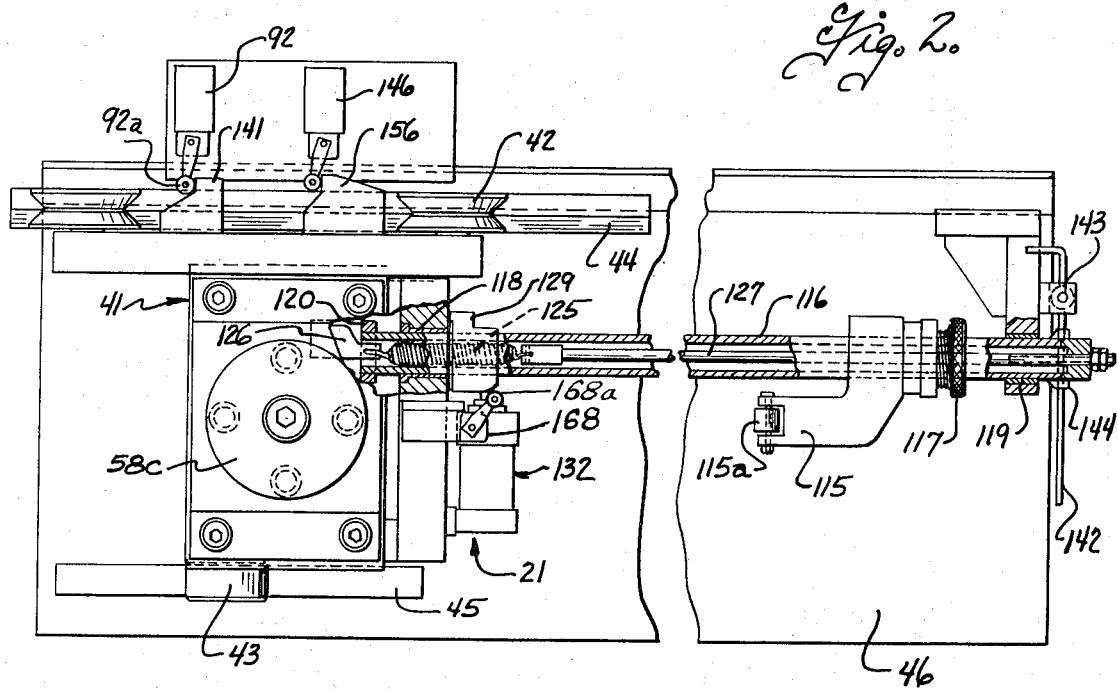
FIG. 2 is a plan view of the hydraulically operated cropping apparatus on a larger scale than FIG. 1, with parts broken away and shown in section to illustrate details of construction.

The hydraulic operator 56 includes a cylinder 57 mounted on the generally horizontal plate 47 of the carriage, and a piston member 58 which is slidable in the cylinder and defines upper and lower motive chambers therein respectively above and below the piston. The piston 58 has a rod 58a which extends through a rod bearing and sealing assembly in the lower cylinder head 57b and which is connected to the shear head 55 for moving the shear member 52. As pointed out hereinafter, the piston 58 is normally positioned in its raised position and, preferably, the piston 58 engages the upper cylinder head 57a when in its fully raised position to form a positive stop. The shear head 55 is attached to the lower end of the piston rod 58a and is shimmed, if necessary, to effect alignment of the shear aperture 52a in the shear member 52 with the aperture 51a in the shear member 51. In order to normally maintain the shear members 52 in a raised position when the machine is shut off, the piston is preferably yieldably biased to its raised position. As shown in FIG. 2, a small diameter piston rod 58b is attached to the upper end of the piston 58 and extends through a piston rod guide and seal assembly in the upper cylinder head 57a. A cross head 58c is attached to the upper end of the rod 58b and springs 58d are interposed between the cross head 58c and the upper cylinder head 57a to yieldably bias the piston rod to its fully raised position.

The force required to move the shear member 52 in a shear stroke is dependent on the type and size of wire being cut and the size of the piston as selected to provide the requisite cutting force without necessitating excessively high hydraulic pressures. For example, a 6 inch diameter piston is suitable for shearing mild steel up to one inch in diameter at hydraulic supply pressures of about 3,000 p.s.i., and the same cylinder can be used for smaller diameter wire with a corresponding decrease in operating pressure. An 8 inch diameter piston is suitable for mild steel up to 1½ inches in diameter at 3,000 p.s.i. and can also be used for smaller diameter wire with a corresponding decrease in operating pressure.

Figure 3:
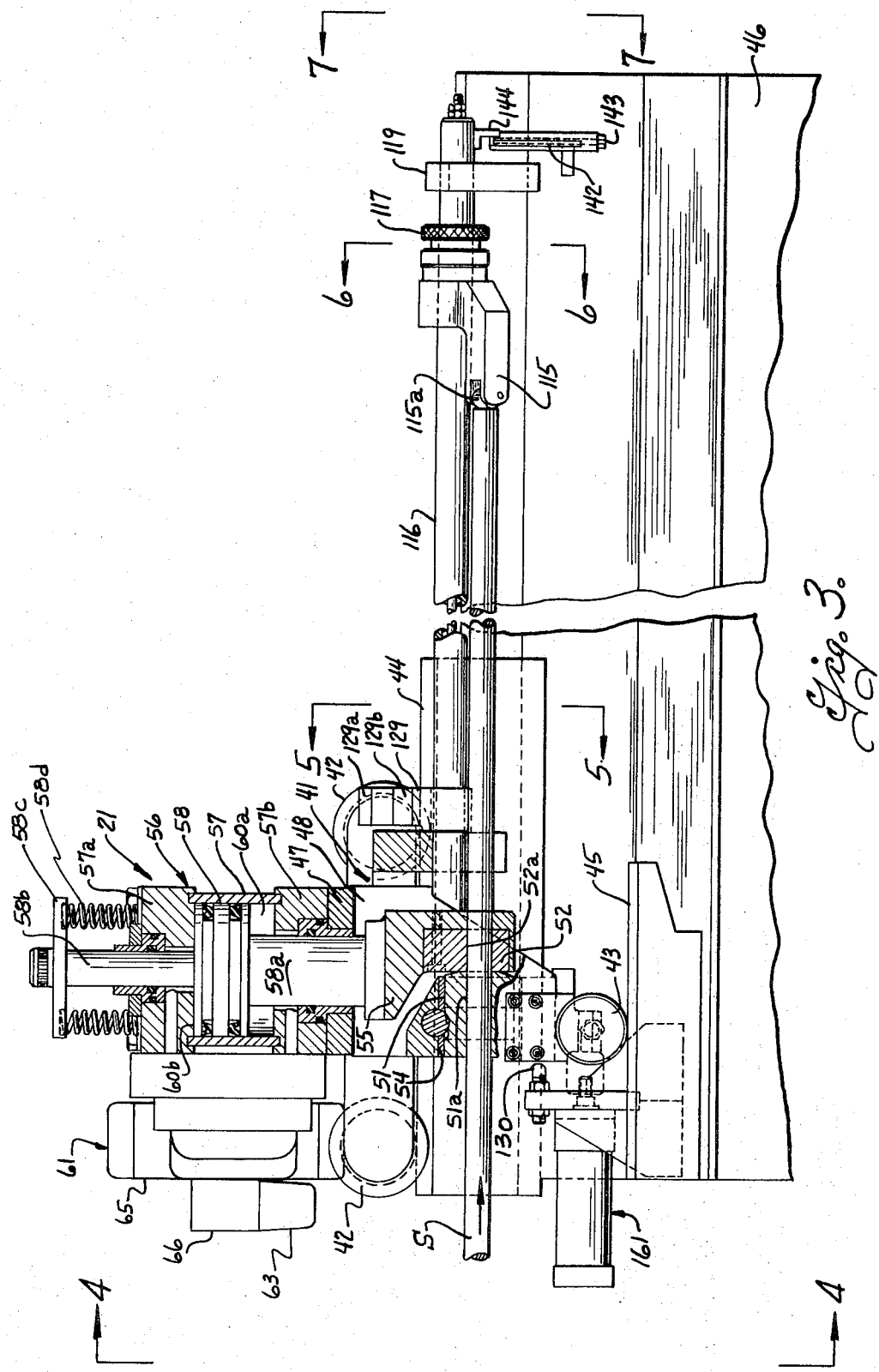
FIG. 3 is a side elevational view of the hydraulically operated cropping apparatus, with parts broken away and shown in section.

The piston 58 defines upper and lower fluid pressure motive chambers 60b and 60a respectively in the cylinder 57 and a flow reversing valve 61 is provided for reversibly applying an exhausting motive fluid pressure from the chambers. The valve 61 is normally positioned to supply fluid pressure to the lower chamber 60a and exhaust fluid pressure from the upper chamber 60b, so as to normally urge the piston and hence the shear member 52 to their normal open position as shown in FIG. 3. The valve has an electroresponsive actuator 63 which is operative, when energized, to move the valve 61 to a second position supplying motive fluid pressure to the upper chamber 60b and exhausting fluid pressure from the lower chamber 60a to thereby move the piston and the shear member 52 downwardly in a shear stroke. When the electro-responsive actuator 63 is de-energized, the valve returns to its first position and again applies motive fluid pressure to the lower motive chamber 60a to return the piston and shear member to their normal open position. Valve 61 is preferably of the pilot-operated type and, as diagrammatically shown in FIG. 9, includes a main two-position flow reversing valve 65 having main pressure and exhaust ports 65a, 65b and controlled outlet ports 65c and 65d which are respectively connected to the motive chambers 60a and 60b in the hydraulic operator cylinder. The main valve has hydraulic actuators 65e and 65f for respectively moving the valve 65 to a first position supplying fluid from the pressure port 65a to the controlled outlet port 65c while exhausting fluid from the other controlled outlet port 65d, to a second position supplying motive fluid pressure to the controlled outlet port 65d while exhausting fluid from the controlled outlet port 65c. The pilot valve 66 is also of the two-position flow reversing type and includes a inlet port 66a, an exhaust port 66b, and controlled outlet ports 66c and 66d which are respectively connected to the hydraulic actuators 65e and 65f of the main valve 65. Pilot valve 66 is normally spring biased by a spring 66e to a first position supplying motive fluid pressure to the controlled outlet 66c while exhausting fluid pressure from the controlled outlet 66d, and the electro-responsive actuator 63 is connected to the pilot valve and is operative, when energized, to move the pilot valve to a second position supplying motive fluid pressure to the controlled outlet 66d while exhausting pressure from the controlled outlet 66c. Pilot valve 66 is preferably of the high pressure type, in order to provide rapid actuation of the main valve in response to actuation of the pilot valve and, as diagrammatically shown in FIG. 9, the pilot valve has its pressure inlet 66a connected to the same pressure supply line 71 that supplies pressure fluid to the pressure inlet 65a of the main valve 65. The main valve 65 has its exhaust port 65b connected through a return line 72 to the reservoir R. The pilot exhaust port 66b, however, is preferably connected through a separate pilot return line 72a to the reservoir, to prevent any back-pressure in the main return line 72 from causing spurious operation of the pilot valve.

Fluid under pressure is supplied by a pump 75 having its inlet 75a connected through a filter 76 to the reservoir R, and its outlet 75b connected through a line 77 and hose fittings 77a to the pressure line 71 leading to the pilot valve and main control valve. The pump 75 is preferably of the adjustable pressure-compensated type, that is a variable displacement pump having a pressure compensator responsive to the pump output pressure for adjusting the pump displacement to maintain a substantially constant preset output pressure under varying flow conditions. The pump is preferably adjustable to vary the output pressure maintained thereby selectively in the range of about 2,000 to 3,000 p.s.i., as required for different size wires. In order to provide the very high but intermittent flow rates required for operating the hydraulic operator, an accumulator 79 of the gas-loaded type and having a capacity large as compared to displacement of the piston 58 in the cylinder 57, is connected through a line 79a to the pump pressure line 77. A check valve 81 is provided in the pressure line 77 between the connection of the accumulator and the pump to prevent return flow and an unloading valve 82 is connected through a flow restrictor 83 to the accumulator, to enable selective dumping of the accumulator when the shear apparatus is not in use. As shown, dump valve 82 is normally biased to a position to dump the accumulator and has an electro-responsive operator 82a which is operative, when energized, to move the valve 82 to a shut-off position. As diagrammatically shown in FIG. 9, the main valve return line 72 is connected through a return line 78 and hose fittings 78a to the reservoir R Pump 75 is driven by a motor 84 which is selectively energized under the control of relay contacts 85a.

As previously described, the valve 61 is normally biased to a position supplying motive fluid pressure to the lower motive chamber 60a in the cylinder to normally position the shear members in their open position shown in FIG. 3, and the valve 61 is operated, when the electro-responsive actuator 63 is energized, to a second position supplying motive fluid pressure to the upper chamber 60b while exhausting it from the lower chamber 60a. Energization of the electro-responsive valve actuator 63 is under the control of a one-shot interval timer 91. Such one-shot interval timers are well known and are operative in response to actuation or closing of a timer control switch, to cause an output switch or relay to transfer and start a time delay period. At the completion of the preselected time delay period, the output switch or relay transfers back to its original condition. The interval timers are arranged so that the duration of the output pulse is substantially independent of the timed duration of actuation of the control switch. Thus, if the control switch is opened during the time cycle it will not affect the time cycle or operation of the unit and the timing cycle is not affected if the control contacts are opened and reclosed during the time cycle. Conversely, the control switch can be maintained closed for a time interval greater than the length of the time cycle without extending the time cycle. In general, timing is accomplished by the charging or discharging of a capacitor through a resistor, and adjustment of the timing period is effected by adjusting either the value of the resistor or the voltage applied to the circuit. For reasons pointed out more fully hereinafter, the interval timer is made adjustable to vary the time interval measured thereby over range from about 0.010 to 0.030 milli-seconds. As diagrammatically shown in FIG. 9, the interval timer has a normally open timer control switch 92 which is operative, when closed, to initiate the timing cycle, and the interval timer is connected as indicated at 91a to an output switch 93 to cause the output switch to transfer at the start of the time interval, and to maintain the output switch closed for the duration of the time interval. At the end of the time interval, the output switch opens to deenergize the output circuit. In order to effect rapid actuation of the electro-responsive actuator 63 at the beginning of the timing cycle, the interval timer is advantageously arranged to apply a pulse of direct current to the electro-responsive valve actuator. As diagrammatically shown in FIG. 9, D-C power is supplied from a D-C power supply 95 which has its input 95a connected through a transformer 96 to the A-C supply lines 97. The D-C power supply 95 provides a D-C output voltage at its output terminals 95b and 95c and the D-C output voltage is applied to lines 98 and 99 to the interval timer to energize the same. D-C power from lines 98 and 99 is also applied through conductor 101, electro-responsive valve actuator 63, conductor 102, output switch 93 and conductor 103 so as to apply D-C power to the electroresponsive actuator under the control of the output switch 93. The control switch 92 for the interval timer is operatively connected to the timer and, as shown is connected through conductors 104 and 105 to the interval timer. Switch 92 is operated, in a manner described more fully hereinafter, to initiate a timing cycle after a preselected length of stock has advanced past the shear members, to shear the measured length of stock. A normally-open manually operable switch 92b can be connected in parallel with the normally-open timer control switch 92 to enable selective manual operation of the shear apparatus.

High quality cuts can be achieved in large size wire stock with a shear stroke that is small as compared to the diameter of the stock. Thus, wire stock of the range of ⅝ to 1½ inches in diameter can be severed with a short stroke of the shear members in the range of ¼ to ⅜ inches, and preferably about 5/16 inches. The working stroke of the piston 58 in the cylinder 57 is selected so as to be substantially greater than the necessary shear stroke and may, for example, be of the order of an inch. The interval timer is selected and adjusted so as to produce a timed output pulse of a short duration, of the order of 0.010 to 0.030 milli-seconds, sufficient to actuate the valve 61 from its normal position to a position supplying fluid pressure to the upper motive chamber 60b and cause the piston and shear members to move in the aforementioned relatively short shear stroke of the order of ¼ to ⅜ inches. At the end of the time interval of the pulse, the valve actuator 63 is deenergized and the valve returns to a position supplying motive fluid pressure to the lower cylinder chamber 60a to thereby rapidly return the shear members to their normal open position. The pressure supplied by the pump 75 is adjusted so as to apply a sufficient force to the piston to effect the shearing operation and the accumulator 79 is charged to this pressure so that, upon opening of the valve, there is a rapid flow of hydraulic fluid to the upper motive chamber to effect rapid operation of the piston and shear members. FIG. 8 graphically interrelates the timing of the control switch signal (curve a), the timer output pulse (curve b), and the piston movement (curve c) for an 8 inch hydraulic operator 21 with an operating pressure of 3,000 p.s.i. As graphically illustrated, the timer output pulse b is initiated upon closing of the control switch and continues for a measured time interval, graphically at about 25 milli-seconds, and is then terminated. The duration of the timer output pulse is not dependent on the duration of actuation of the control switch and the control switch can remain actuated for a time interval greater than the measured time interval of the timer output pulse as indicated by the dashed curve a'. There is a slight delay after actuation of the control switch and initiation of the timer output pulse until the operator piston 58 begins to move and the piston thereafter continues to move in its shear stroke until the end of the timer output pulse. At the end of the timer output pulse, the valve actuator 63 is deenergized and spring 66e returns the valve to its initial position and the operator piston then begins return movement back to its normal position. The overall cycle time is relatively short, and in the example illustrated, is about 55 milli-seconds, approximately twice the duration of the timer output pulse. The duration of the timer output pulse required to produce a piston movement of the order of ¼ to ⅜ inches will vary somewhat in different installations dependent on various factors including diameter of the hydraulic operator 21; differences in electrical and hydraulic impedance in the valve actuator 63 and valve 61, as well as difference in inertia of the various moving parts. However, the interval timer is adjustable to change the measured time interval of the output pulse and when starting a shearing operation, the timer can be manually adjusted while observing the shear stroke, to a value to produce a shear stroke in the desired range of about ¼ to ⅜ inches. In general, it has been found that a short duration timer output pulse in the range of 10 to 30 milli-seconds is sufficient to produce the desired shear stroke, if valve 61 is of sufficiently large size to pass the required flows of hydraulic fluid to and from the hydraulic operator without excessive pressure loss.

Provision is made for actuating the switch 92 after a preselected length of stock has advanced past the shear members. In the preferred embodiment illustrated, a stock gauge 115 is mounted to extend in the path of movement of the end of the stock to engage the same after a preselected length of stock has advanced past the shear members, and to effect movement of the shear members with the stock. The stock gauge is mounted for adjustment along a stock gauge tube 116 and is arranged to be locked in a selectively adjusted position therealong by mechanism indicated at 117. As shown in FIG. 2, the stock gauge tube is slidably and rotatably supported at one end in a bearing 118 on the carriage and at its other end in a bearing 119 on the base 46 for limited axial movement relative to the carriage in a direction paralleling the length of the stock. A stop member 120 is provided on the end of the tube and arranged to engage the carriage after the tube has moved a preselected distance relative thereto, to thereafter move the carriage with the tube 116 and stock gauge 115. The stock gauge is yieldably biased axially to a retracted position shown in FIG. 2 by a spring 125 which is nonrotatably attached to an anchor 126 on the carriage and nonrotatably connected to a rod 127 secured to the tube 116. For reasons pointed out hereinafter, the spring 125 is also advantageously arranged to torsionally bias the tube in a clockwise direction as viewed from the left end in FIG. 2. The stock gauge 115 extends laterally from the tube 116 and into the path of movement of the stock and a roller 115a is preferably provided on the stock engaging end, to facilitate movement of the stock gauge in a direction crosswise of the path of movement of the stock.

An arm 129 is nonrotatably attached to the gauge tube 116 and extends laterally thereof as best shown in FIG. 5. A stop 131 is mounted on the carriage for engagement with the outer end 129a of the arm 129 to limit rotary movement of the arm 129 in a counterclockwise direction as viewed in FIG. 5 and normally position the stock gauge 115 in the path of movement of the stock as shown in FIGS. 2, 3 and 6. A single acting fluid actuator 132 is mounted on the carriage and has its plunger 132a arranged to engage a pressure face 129b on the arm to move the arm in a clockwise direction as viewed in FIG. 5, when the operator 132 is actuated, and thereby raise the stock gauge 115 above the path of movement of the stock. The fluid operator 132 is operated under the control of a valve 136 (see FIG. 9) having a pressure inlet 136a connected through a pressure regulator 137 to an air supply source 138, and a controlled outlet 136b connected to the fluid operator 132. As shown in FIG. 9, valve 136 is normally spring biased by a spring 136c to a position communicating the motive chamber in cylinder 132 to exhaust 136e, and the valve is movable under the control of an electro-responsive actuator 136d to a position supplying motive fluid pressure to the actuator 132.

The shear carriage is normally retracted to a position shown in FIG. 3 in engagement with a carriage stop 130. The stock feed mechanism 22 is arranged to advance the stock past the shear members and when the stock engages the stock gauge 115, it moves the gauge axially relative to the carriage until the stop 120 on the stock gauge tube engages the carriage. Thereafter, continued movement of the stock causes the carriage to advance forwardly with the stock. The control switch 92 for the interval timer 91 is operated by a cam 141 connected to the carriage for movement therewith. The cam 141, when the carriage is in its initial or retracted position shown in FIGS. 3 and 9, engages the switch actuator 92a and moves the normally closed timer control switch 92 to its open position as shown in FIG. 9. As the carriage starts its forward movement, it allows the timer control switch 92 to close to initiate a timing cycle and to move the shear member 52 in a shear stroke. The stock gauge 115 is moved out of the path of movement of the stock after the shear member 52 has started movement in its shear stroke. In the embodiment illustrated, operation of the valve 136 to move the stock gauge out of the path of movement of the stock is controlled by a second interval timer 145. Interval timer 145 is also of the single shot type which is operative in response to closing of the control switch 146 to cause the output switch or relay 147 to transfer and start the time delay period. At the completion of the time delay period, the output switch transfers back to its original condition. As shown, voltage is applied to the interval timer at all times through conductors 148 and 149 from the D-C power supply 95 and D-C power is applied through conductor 151, electro-responsive actuator 136d, conductor 152, timer output switch 147 and conductor 153 to energize the electroresponsive actuator during the time interval that the output switch is closed. The timer control switch 146 is connected to the interval timer 145 through conductors 154 and 155 and operates the interval timer when the switch 146 is closed. Switch 146 is conveniently operated by a second cam 156 on the carriage and positioned so as to engage the switch actuator 146a and hold the switch 146 open when the carriage is in its initial or retracted position, and to also maintain the switch 146 open during movement of the carriage from its initial position until after the cam 141 allows switch 92 to close. In this manner, the stock gauge 115 remains in engagement with the end of the stock until after the start of the shearing cycle, and the stock gauge is then moved upwardly out of the path of the stock. The interval timer is adjusted so as to maintain the stock gauge out of the path of the stock for a time interval sufficient to allow movement of the stock out of the shear apparatus, but less than the time required to advance a succeeding length of stock to the stock gauge.

A safety flag 142 is advantageously provided to engage the stock and operate the shear apparatus, in the event the stock gauge 115 is not returned to a stock engaging position in time to engage the end of the advancing stock. The flag 142 is pivotally mounted by a bracket 143 on the base and extends into the path of the stock S at a location after the stock gauge 115. The flag 142 is positioned to engage the end of the stock S, if for any reason the latter does not engage the stock gauge 115, and the flag is arranged to engage an abutment 144 on the stock gauge tube 116 to shift the stock gauge tube axially to the right as viewed in FIGS. 2 and 3, to advance the shear carriage from its normal position and initiate a shear cycle in the manner previously described in connection with the stop gauge 115.

The carriage is returned to its initial position after the stock gauge has moved out of the path of movement of the stock by a cylinder assembly 161. The cylinder assembly includes a cylinder 161a which is mounted as best shown in FIG. 3 on the base 46 and which has a piston 161b connected to the carriage for movement therewith. Pneumatic pressure is supplied to the rod end of the cylinder 161a to yieldably bias the carriage to a retracted position under the control of a valve 162. Valve 162 has a pressure inlet 162a connected through a flow regulator 163 to the pneumatic pressure supply 138, and a controlled outlet 162b connected to the rod end of the cylinder. Valve 162 is normally biased by a spring 162c to a position supplying fluid from the pressure inlet 162a to the controlled outlet 162b and is movable under the control of an electro-responsive actuator 162d to a second position blocking the controlled inlet 162a and venting the controlled outlet 162b to an exhaust line 166. Exhaust line 166 has an adjustable flow regulator 167 for regulating the rate of discharge of fluid from the cylinder 161. Electro-responsive actuator 162d is energized under the control of a switch 168 and is connected to the A-C power supply through conductors 171 and 172. Switch 168 is mounted on the carriage and has its switch actuator 168a positioned adjacent the outer end 129a of the arm 129. Switch 168 is of the normally open type and is positioned in the path of movement of the outer end 129a of the arm 129 during extension of the guage tube so as to be moved to its closed position when the stock engages the stock gauge and advances the guage tube relative to the carriage. This operates the valve 162 to move the same to its second position exhausting the cylinder 161a through the restricted orifice 167 to control forward movement of the carriage. As previously described, as the carriage moves forwardly, it first operates the shear control switch 92 to start the shearing operation and shortly thereafter operates the guage control switch 146 to move the gauge to its inoperative position. When the gauge moves to its inoperative position, it moves the control arm 129 to a position releasing the switch actuator 168a to deenergize the actuator 162d and allow the valve 162 to return to a position shown in FIG. 9 applying fluid pressure to the cylinder 161 to retract the carriage.

The two-speed mechanism 25 for the feed rolls 23, 24 is preferably operated to reduce the speed of the stock from a normal high speed feed; for example, 80 to 100 feet per minute, to a low speed; for example, 20 feet per minute, after the stock engages the stock gauge 115 and before the stock gauge causes movement of the cropping apparatus carriage 41. As schematically shown in FIG. 9, a normally open switch 168b is connected in series with the electro-responsive valve actuator 31a to energize the same and move the valve 31 to its second or slow speed position fluid from only the low valve pump 27 to the feed roll drive motor 32 while bypassing fluid from the high volume pump 26 back to the reservoir. Switch 168 is conveniently operatively connected to or formed as a part of switch 168 so as to be actuated to its closed position when the stock engages the stock gauge and shifts it axially relative to the carriage 41.

As schematically shown in FIG. 9, electrical power is supplied to the control apparatus from a supply source 181 through a transformer 182 to power conductors 97. A control relay 184 is connected in series circuit across the power conductors with a normally open start switch 185 and a normally closed stop switch 186, and relay 184 is operative, when energized, to close normally open relay contacts 184a connected in parallel with the start switch 185 to maintain a holding circuit for the relay 184. Valve actuator 82a for the accumulator unloading valve 82 is connected through conductors 187 in parallel with the relay 184 so as to be energized when relay 184 is energized to thereby operate valve 82 to a closed position blocking unloading of the accumulator. Relay 184 also operates relay contacts 184*b* connected in series with a motor start relay 85 so as to close the motor control relay contacts 85*a* and energize the pump drive motor 84.

From the foregoing it is thought that the construction and operation of the shear apparatus to automatically shear in sections from an elongated metal stock, will be readily understood. The shear members are moved through only a relatively short stroke, of the order of ¼ to ⅜ inches, and a total volume of hydraulic fluid necessary to move the cylinders in such a short stroke is relatively small, of the order of 6 to 7 cubic inches for a 6 inch cylinder. For high quality cut, it is desirable to effect very rapid movement of the shear members in their shear stroke and return, for example to move the shear members in the shear stroke in 10 to 30 milli-seconds and then rapidly return the same. The main flow control valve 65 is accordingly selected of a size to have a flow capacity sufficient to pass the requisite volume of hydraulic fluid to and from the cylinder to effect the movement of the same in the shear stroke in that short time interval. For example, for a six inch cylinder, the valve should be of the nominal ¾ to 1 inch size and for an eight inch cylinder, the valve should be a 1¼ to 1½ inch size valve. The accumulator 79 has a hydraulic capacity substantially larger than that required to effect movement of the cylinder, and the accumulator is precharged by the pressure compensated pump to a pressure which is adjusted in relation to the size of the stock so as to provide the requisite force for shearing the stock.

The stock feed mechanism advances the stock past the shear members and, when the end of the stock engages the stock gauge, it initially moves the stock gauge and gauge tube axially relative to the carriage and operates the switch 168. Switch 168 operates valve 162 to vent the carriage retracting cylinder 161*a* to atmosphere through the flow restrictor 167 and allow controlled forward movement of the carriage with the stock. Switch actuator 168*a*, when operated, also closes normally open switch 168*b* to actuate valve 31 to its second or low speed position to slow the rate of feed of the stock S before the stop 120 on the stock gauge tube engages the carriage 41 to start forward movement of the carriage. As the carriage begins its forward movement, cam 141 allows switch 92 to close to trigger the interval timer 91 and close the timer output switch 93 for a selected short time interval of the order of 10 to 30 milli-seconds. The interval timer 91 is adjustable to vary the time interval of the output pulse, and the timer is adjusted so that the electro-responsive valve actuator 63 is energized for a time interval sufficient to effect movement of the pilot and main valves to their second position and movement of the piston and shear members in a shear stroke of the order of ¼ to ⅜ inches. At the end of the timed interval, the interval timer 91 deenergizes the valve actuator 63 and spring 66*e* returns the valve 61 to its initial position and applies fluid pressure to the piston 58 to return the shear members 52, 51 to their normal open position. A short time after initiation of the shearing cycle, continued forward movement of the carriage causes cam 156 to disengage actuator 146*a* and allows the control switch 146 to close and actuate the interval timer 145. The output switch 147 of interval timer 145 is closed for a short time interval sufficient to energize the electro-responsive actuator 136*d* for the stock gauge eject valve 136 to move the stock gauge to its inoperative position. As soon as the stock gauge moves to its inoperative position, switch actuator 168*a* is disengaged and switch 168 moves to its normally open position to allow valve 162 to return to its normal position shown in FIG. 9 and apply fluid pressure to the carriage return cylinder 161 to return the carriage to its initial position. In this manner, the carriage is moved rearwardly relative to the sheared end of the stock so as to facilitate discharge of the sheared section of stock from the shear apparatus. In addition, when switch actuator 168*a* is disengaged, switch 168*b* moves to its normally open position to allow valve 31 to return to its high speed position shown in FIG. 1 to resume high speed feed of the stock S.

The embodiments of the invention in which an exclusive property or privilege is claimed are defined as follows:

1. In an apparatus for shearing end sections from elongated metal stock including first and second shear members mounted for relative movement in a direction crosswise of the stock from a normal open position in a shear stroke to shear an end section from the stock and in a return stroke back to said normal open position, a hydraulic operator including cylinder and piston means operatively connected to said first and second shear members, said piston means defining a motive chamber in said cylinder means and being movable therein in a piston stroke greater than said shear stroke, hydraulic fluid pressure supply means including valve means for reversibly supplying motive fluid pressure to said motive chamber, said valve means including means normally moving the same to a first position exhausting fluid from said motive chamber to return said shear members to said normal open position and an electro-responsive actuator operative when energized to move said valve means to a second position supplying motive fluid pressure to said motive chamber to move said shear members in said shear stroke, adjustable one-shot interval timer means having an output circuit connected to said electro-responsive actuator and control switch means, said interval timer means being operative each time said control switch means is actuated to apply a short duration electrical pulse to said electro-responsive actuator means to energize the same, said interval timer means being settable to time the duration of said electrical pulse to a time value sufficient to move said shear members in said shear stroke and insufficient to move said piston means through its full piston stroke, and means operative when said electro-responsive actuator is deenergized for moving said shear members back to the normal open position thereof.

2. An apparatus for shearing according to claim 1 including means for moving the elongated metal stock axially past said shear members when the latter are in their normal open position, and means for actuating said control switch means after a preselected length of stock has advanced past said shear members.

3. An apparatus for shearing according to claim 1 including means for moving the elongated metal stock axially past said shear members when the latter are in their normal open position, carriage means mounting said shear members and said hydraulic operator for limited movement in a direction paralleling the path of movement of said stock, stock gauge means on said carriage means engageable with the end of the stock for moving the carriage means with the stock upon engagement thereby, and means for actuating said control switch means after the stock has engaged said stock gauge.

4. An apparatus for shearing according to claim 1 wherein said shear stroke is in a range of about ¼ to ⅜ inches.

5. In an apparatus for shearing end sections from elongated metal stock including, first and second shear members mounted for relative movement in a direction crosswise of the stock from a normal position in a shear stroke to shear an end section from the stock and in a return stroke to said normal position, a double acting hydraulic operator including cylinder and piston means operatively connected to said first and second shear members, said piston means defining first and second motive chambers in said cylinder means and being movable therein in a piston stroke greater than said shear stroke, hydraulic fluid pressure supply means including four-way valve means connected to said first and second motive chambers of said cylinder means for reversibly supplying fluid pressure thereto, said four-way valve means including means for normally moving the same to a first position supplying hydraulic fluid under pressure to said first motive chamber to return said shear members to said normal position and an electro-responsive actuator operative when energized to move said four-way valve means to a second position supplying fluid under pressure to said second motive chamber to move said shear members in said shear stroke, adjustable one-shot interval timer means having an output circuit means connected to said electro-responsive actuator and a control switch means, said interval timer means being operative in response to actuation of said control switch means to apply a short duration electrical pulse to said electro-responsive valve actuator means to energize the same, said interval timer means being adjustable to vary the time duration of said electrical pulse to a value sufficient to move said shear members in said shear stroke and insufficient to move said piston means through its full piston stroke whereby said means for normally moving the four-way valve means is operative when the electro-responsive actuator means is deenergized to move said four-way valve means back to its first position and effect movement of said shear members in said return stroke back to said normal position thereof.

6. An apparatus for shearing according to claim 5 wherein said interval timer means is operative to apply a D-C pulse to said electro-responsive operator means.

7. An apparatus according to claim 6 wherein the time duration of said pulse is in a range of about 10 to 30 milli-seconds.

8. An apparatus for shearing according to claim 5 wherein said shear stroke of said shear members is short as compared to the cross-section of the metal stock being cut.

9. An apparatus according to claim 8 wherein said shear stroke is of the range of about ¼ to ⅜ inches.

10. An apparatus for shearing in accordance with claim 5 wherein said first and second shear members each comprise an apertured cutting die having an aperture for slidably receiving the stock, said shear members being disposed with their apertures in axial alignment when said shear members are in said normal position and being relatively movable crosswise of said apertures in a shear stroke which is short as compared to the cross-section of the stock to shear an end section from the stock.

11. An apparatus for shearing according to claim 5 including means for moving the elongated metal stock axially past said shear members when the latter are in their normal position, and means for actuating said control switch means after a preselected length of stock has advanced past said shear members.

12. An apparatus for shearing according to claim 5 including means for moving the elongated metal stock axially past said shear members when the latter are in their normal position, carriage means mounting said shear members and said hydraulic operator for movement in a direction paralleling the path of movement of the stock, stock gauge means on said carriage means engageable with the end of the stock for gauging a preselected length of stock and for moving the carriage means with the stock, and means for actuating said control switch means after the stock has engaged said stock gauge.

13. An apparatus for shearing according to claim 5 wherein said fluid pressure supply means includes an adjustable pressure-compensated pump and a gas loaded accumulator communicating with the pump outlet and having a capacity which is large as compared to the displacement of said piston means in said cylinder means.

* * * * *